United States Patent
Xu et al.

(10) Patent No.: US 10,447,700 B2
(45) Date of Patent: Oct. 15, 2019

(54) METHOD FOR CONTROLLING, CHARGING, AND POSITIONING A UE IN A SMALL CELL SYSTEM

(71) Applicant: Samsung Electronics Co., Ltd., Suwon-si, Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/113,984

(22) PCT Filed: Jan. 26, 2015

(86) PCT No.: PCT/KR2015/000804
§ 371 (c)(1),
(2) Date: Jul. 25, 2016

(87) PCT Pub. No.: WO2015/111978
PCT Pub. Date: Jul. 30, 2015

(65) Prior Publication Data
US 2016/0344739 A1    Nov. 24, 2016

(30) Foreign Application Priority Data

Jan. 27, 2014  (CN) .......................... 2014 1 0040045

(51) Int. Cl.
*H04L 29/06*  (2006.01)
*H04W 16/24*  (2009.01)
(Continued)

(52) U.S. Cl.
CPC ............ *H04L 63/102* (2013.01); *H04L 63/08* (2013.01); *H04W 8/06* (2013.01); *H04W 8/186* (2013.01);
(Continued)

(58) Field of Classification Search
CPC ...... H04L 63/102; H04L 63/08; H04W 36/08; H04W 88/08; H04W 16/24; H04W 8/06; H04W 8/186; H04W 36/04
See application file for complete search history.

(56) References Cited

U.S. PATENT DOCUMENTS

| 10,104,585 B2* | 10/2018 | Park ...................... H04W 36/00 |
| 2010/0120399 A1* | 5/2010 | Guo .................. H04L 29/12207 455/411 |

(Continued)

FOREIGN PATENT DOCUMENTS

| CN | 102123394 A | 7/2011 |
| CN | 102415147 A | 4/2012 |

(Continued)

OTHER PUBLICATIONS

Zte et al., Text Proposal for CSG Support in dual connectivity, 3GPP TSG-RAN WG3 Meeting #87, R3-150240, Feb. 9-13, 2015, Athens, Greece.

(Continued)

*Primary Examiner* — Harunur Rashid
(74) *Attorney, Agent, or Firm* — Jefferson IP Law, LLP

(57) ABSTRACT

A method for controlling, charging and positioning a UE is disclosed, which includes: a master base station sending closed subscriber group (CSG) member status of the UE in a secondary cell to a secondary base station; the master base station sending a CSG identity of the secondary cell and a PLMN identity selected for the UE that serves the UE in a cell of the secondary base station to a mobility management entity (MME); the MME validating CSG member status of the UE in the secondary cell; and the MME sending the validated CSG member status to the master base station with the present application, the UE is able to properly access to the secondary cell, and access control and member valida- (Continued)

tion, charging, and positioning may be performed for the UE reasonably, which improves the user experience.

20 Claims, 7 Drawing Sheets

(51) Int. Cl.
| | | |
|---|---|---|
| *H04W 8/06* | (2009.01) | |
| *H04W 8/18* | (2009.01) | |
| *H04W 36/04* | (2009.01) | |
| *H04W 36/08* | (2009.01) | |
| *H04W 36/00* | (2009.01) | |
| *H04W 84/04* | (2009.01) | |
| *H04W 88/08* | (2009.01) | |
| *H04W 64/00* | (2009.01) | |

(52) U.S. Cl.
CPC ....... *H04W 16/24* (2013.01); *H04W 36/0069* (2018.08); *H04W 36/04* (2013.01); *H04W 36/08* (2013.01); *H04W 64/00* (2013.01); *H04W 84/042* (2013.01); *H04W 84/045* (2013.01); *H04W 88/08* (2013.01)

(56) References Cited

U.S. PATENT DOCUMENTS

| | | | | |
|---|---|---|---|---|
| 2010/0279687 | A1* | 11/2010 | Horn | H04W 36/08 455/435.1 |
| 2011/0171953 | A1* | 7/2011 | Faccin | H04W 48/08 455/426.1 |
| 2012/0082082 | A1 | 4/2012 | Etemad et al. | |
| 2012/0163293 | A1* | 6/2012 | Mildh | H04W 12/08 370/328 |
| 2012/0207128 | A1 | 8/2012 | Wang | |
| 2013/0005340 | A1* | 1/2013 | Drazynski | H04W 8/186 455/436 |
| 2013/0070710 | A1* | 3/2013 | Guo | H04W 4/005 370/329 |
| 2013/0215772 | A1 | 8/2013 | Kaur et al. | |
| 2013/0260768 | A1 | 10/2013 | Guo et al. | |
| 2014/0187246 | A1 | 7/2014 | Jha et al. | |
| 2015/0072686 | A1 | 3/2015 | Xu et al. | |
| 2015/0124708 | A1* | 5/2015 | Blankenship | H04W 12/08 370/329 |
| 2015/0124743 | A1* | 5/2015 | Damnjanovic | H04L 5/001 370/329 |
| 2015/0173047 | A1* | 6/2015 | Yamada | H04W 72/042 370/329 |
| 2016/0249259 | A1* | 8/2016 | Park | H04W 36/00 |
| 2017/0105128 | A1 | 4/2017 | Chiba et al. | |

FOREIGN PATENT DOCUMENTS

| | | |
|---|---|---|
| CN | 102905387 A | 1/2013 |
| CN | 102958094 A | 3/2013 |
| EP | 3 123 781 A1 | 2/2017 |
| JP | 2012-526468 A | 10/2012 |
| WO | 2013/024654 A2 | 2/2013 |
| WO | 2013/137684 A1 | 9/2013 |
| WO | 2014010864 A1 | 1/2014 |

OTHER PUBLICATIONS

Huawei, Text Proposal for SeNB Addition procedure, 3GPP TSG-RAN WG3 Meeting #82, R3-132068, Nov. 11-15, 2013, San Francisco, USA.
Samsung, Xn main procedures, R3-132316, 3GPP TSG-RAN WG3 #82, San Francisco, CA, USA, Nov. 11, 2013.
Samsung et al., Support for connected mode inbound mobility to shared CSG/hybrid cell, R3-131566, 3GPP TSG-RAN WG3 #81, Barcelona, Spain, Aug. 23, 2013.
Huawei, Text Proposal for SeNB Addition procedure, R3-132068, 3GPP TSG-RAN WG3 #82, San Francisco, CA, USA, Nov. 1, 2013.
3GPP; Technical Specification Group Services and System Aspects; General Packet Radio Service (GPRS) enhancements for Evolved Universal Terrestrial Radio Access Network (E-UTRAN) access (Release 12), 3GPP TS 23.401 V12.3.0, Dec. 17, 2013.
3GPP TSG-RAN WG3 Meeting #82, Nov. 15, 2013, R3-132068.
Ericsson, "[Change Request] Membership Verification for HeNB Enhanced Mobility", 3GPP TSG-RAN WG2 Meeting #80, Nov. 21, 2012, R2-125991.
European Office Action dated Nov. 12, 2018, issued in European Patent Application No. 15740143.1.
Chinese Office Action dated Dec. 4, 2018, issued in Chinese Patent Application No. 201410040045.1.
Japanese Office Action dated Dec. 21, 2018, issued in Japanese Patent Application No. 2016-548740.

* cited by examiner

METHOD FOR CONTROLLING, CHARGING, AND POSITIONING A UE IN A SMALL CELL SYSTEM

TECHNICAL FIELD

The present invention relates to wireless communication technologies, and especially to a method for controlling, charging, and positioning a UE in a small cell system.

BACKGROUND ART

Modern mobile communication technologies tend to provide multi-media services with a high transmission rate. FIG. 1 is a system architecture evolution (SAE) system architecture.

In FIG. 1, user equipment (UE) 101 is a terminal device that receives data. Evolved universal terrestrial radio access network (E-UTRAN) 102 is a radio access network, which includes a macro base station (eNodeB/NodeB) that provides a radio network interface for the UE. Mobility management entity (MME) 103 is responsible for managing mobility context, session context and security information of the UE. Serving gateway (SGW) 104 is mainly responsible for providing a user plane, and the MME 103 and the SGW 104 may be located in a same physical entity. Packet data network gateway (PGW) 105 is responsible for functions such as charging, lawful interception, etc., and it may also be located in a same physical entity with the SGW 104. Policy and charging rules function (PCRF) 106 provides QoS policies and charging rules. Serving GPRS support node (SGSN) 108 is a network node device that provides routing for data transmission in a universal mobile telecommunications system (UMTS). Home subscriber server (HSS) 109 is a home sub-system of the UE, responsible for protecting user information such as a current location of the user equipment, an address of a serving node, user security information, packet data context of the user equipment, etc.

3GPP raises requirements of small cell enhancements in release 12 (Rel-12). Targeted scenarios of small cell enhancements include scenarios with macro cell coverage and without macro cell coverage, indoor and outdoor scenarios, and enhancements for ideal and non-ideal backhaul, as shown in FIG. 2.

In the circumstance that there is macro cell coverage, a carrier aggregation technology between different base stations may be deployed. A Macro cell and a small cell may work at different frequency bands. There are two kinds of architectures when using the carrier aggregation technology between different base stations, namely radio-access-network (RAN) based separate architecture and core-network (CN) based separate architecture of user plane data. Core-network based separate architecture means that, for bearers that are set up in a pico cell, data is directly sent to the pico cell by a SGW of a core network, and a user plane will not be forwarded by a macro cell.

In the small cell architecture, a UE can send/receive data at two base stations at the same time, which is called dual-connectivity. One of the base stations, which is responsible for sending radio resource control (RRC) messages to the UE and is responsible for interaction with a core network control entity, is called a master base station, MeNB, and the other base station is a secondary base station, SeNB. There is a cell at the master base station for the UE, which is a primary cell of the UE, Pcell, and RRC messages are sent to the UE via the primary cell, other cells are secondary cells, Scells. Among Scells of the secondary base station, a Scell is a primary cell of the secondary base station, pScell (having functions of a pScell). There are uplink physical layer control channels in the pScell, and there is no uplink physical layer control channel in other Scells. A cell group of the master base station is a master cell group (MCG) and a cell group of the secondary base station is a secondary cell group (SCG).

DISCLOSURE OF INVENTION

Technical Problem

The base stations in the small cell architecture may be a macro base station, eNB, or may be a home base station, HeNB. In the circumstance that the secondary base station is a HeNB, how to add a bearer in a cell of the secondary base station and how to perform access control and member authentication for a UE when add the bearer in the cell of the secondary base station is a problem that has not yet been solved in the traditional art.

Meanwhile, how to charge and position a UE is a problem that has not been solved in the traditional art.

Solution to Problem

A method for controlling, charging and positioning a user equipment (UE) in a small cell system is provided according to the present invention. With the method of the present invention, reasonable access control and member validation may be performed for the UE, and reasonable charging and positioning may be performed for the UE, which improves the user experience.

The method for controlling the UE includes:
a master base station sending closed subscriber group (CSG) member status of the UE in a secondary cell to a secondary base station;
the master base station sending a CSG identity of the secondary cell and a PLMN identity selected for the UE that serves the UE in the secondary cell of the secondary base station to a mobility management entity (MME);
the MME validating the CSG member status of the UE in the secondary cell;
the MME sending a validated CSG member status to the master base station; and Preferably, the master base station sends the validated CSG member status to the secondary base station when the validated CSG member status is inconsistent with the CSG member status of the UE in the secondary cell.

Preferably, the MME performs member validation for the UE according to the CSG identity of the secondary cell and the PLMN identity that serves the UE in the secondary cell of the secondary base station.

Preferably, when the PLMN identity selected by the master base station for the UE that serves the UE in the cell of the secondary base station is inconsistent with a PLMN identity selected by the master base station for the UE that serves the UE in a cell of the master base station, the master base station sends the PLMN identity selected for the UE that serves the UE in the secondary cell of the secondary base station to the MME.

Preferably, the method further includes a step of:
if a PLMN identity or a CSG identity or CSG member status of a target cell to which a bearer is handed over is inconsistent with that in a source cell, the MME sending the PLMN identity, and/or the CSG identity, and/or the CSG member status of the target cell to a serving gateway (SGW) and a packet data network gateway (PGW).

A method for charging and positioning a UE in a small cell system, characterized in that for charging and positioning a bearer includes:

a master base station sending a cell identity and/or TAI of a secondary cell where each bearer of the UE is located to a MME; and the MME sending the cell identity and/or TAI of the cell where each bearer is located and/or a bearer identity to a SGW and/or a PGW.

A method for charging and positioning a UE in a small cell system, characterized in that, for charging and positioning a primary secondary cell in a secondary base station (pScell) includes:

a master base station sending a cell identity and/or TAI of the pScell in the secondary base station of the UE and a bearer identity of a bearer of the UE in the secondary base station to a MME; and the MME sending a cell identity and/or TAI of a cell where each bearer is located to a SGW and/ or a PGW.

Preferably, the method further includes a step of: the secondary base station sending the cell identity of the pScell to the master base station.

A method for charging and positioning a UE in a small cell system, performing charging and positioning according to a primary cell of a master base station, includes:

the master base station sending a cell identity and TAI of the primary cell of the master base station to a MME; and the MME sending the cell identity and/or TAI of the primary cell of the master base station to a SGW/ a PGW.

Advantageous Effects of Invention

As is seen from the above technical solutions, with the methods for controlling, charging and positioning the UE in the small cell system, the UE is able to properly access to the secondary cell, and access control and member validation, charging, and positioning may be performed for the UE reasonably, which improves the user experience.

MODE FOR THE INVENTION

The object, technical solution and advantage of the present invention will be better understood after the present application is further described with reference to the drawings in the following.

Figure 1:
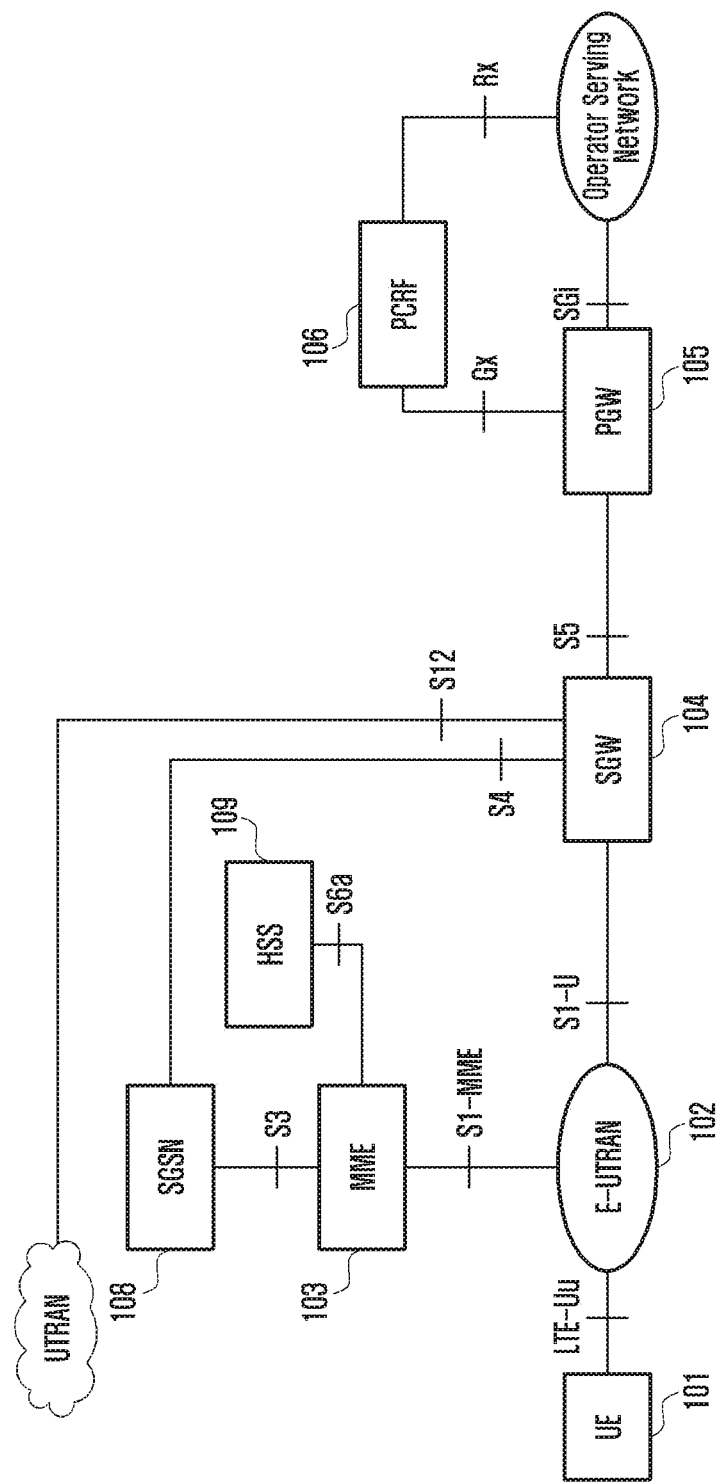
FIG. 1 is a traditional SAE system architecture.
Figure 2:
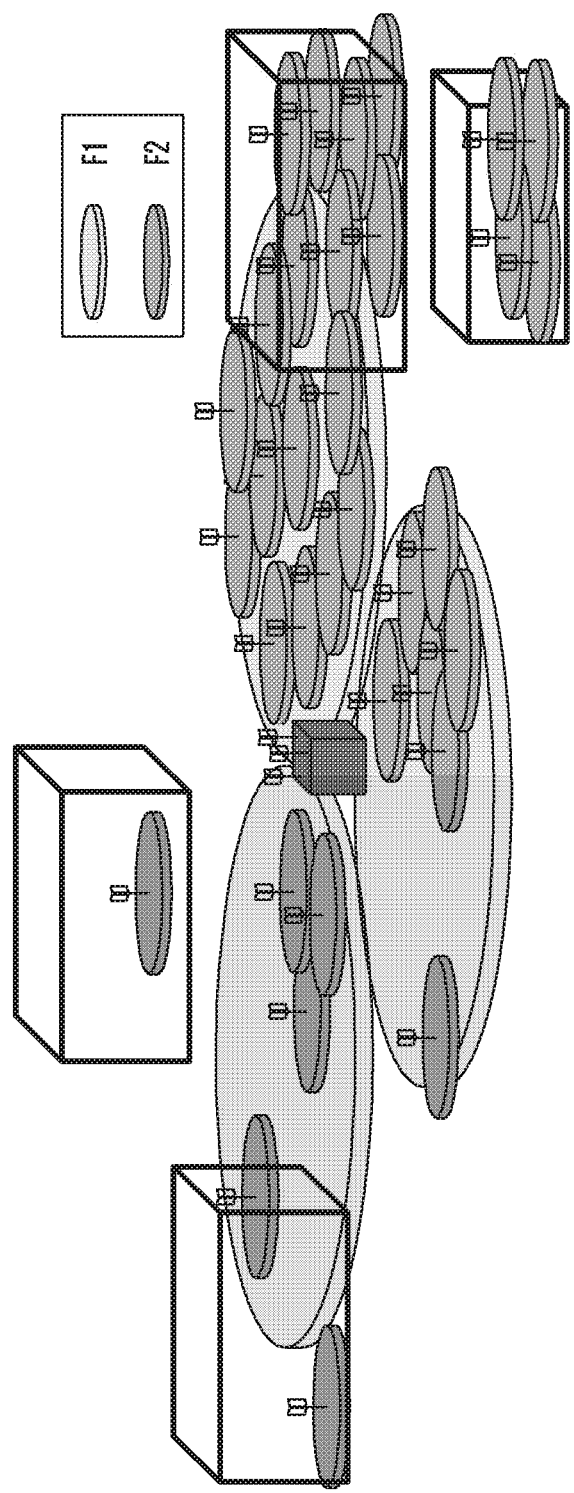
FIG. 2 is a small cell enhancement deployment scenario.
Figure 3:
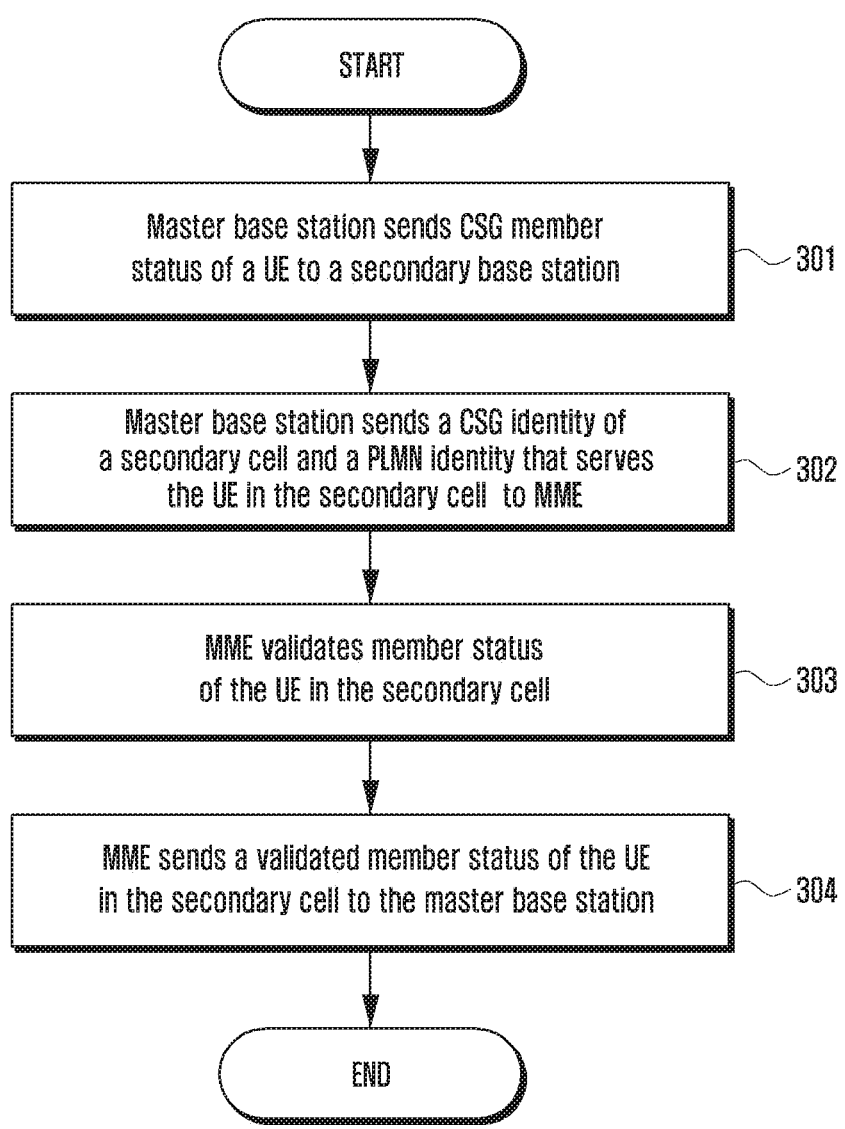
FIG. 3 is a schematic diagram of a method for controlling, charging, and positioning a UE in a small cell system according to the present invention.

FIG. 3 is a schematic diagram of a method for controlling, charging, and positioning a UE in a small cell system according to the present invention. The method includes the following process.

At step 301, a master base station sends closed subscriber group (CSG) member status of the UE in a cell of a secondary base station to the secondary base station. The master base station sends the CSG member status of the UE in the cell of the secondary base station to the secondary base station when the master base station add the cell of the secondary base station or modify the cell of the secondary base station. The master base station may send CSG member status of the UE in a secondary cell of the secondary base station to the secondary base station via a secondary cell group (SCG) command or via a secondary eNB addition or modification message.

The master base station receives the CSG member status information of the UE in the secondary cell from the UE. The master base station obtains a CSG identity of the secondary cell from the UE or via an X2 setup procedure or via operations & maintenance (O&M).

If the secondary base station is a home base station, then the master base station may add a cell of the secondary base station into a secondary cell group in the following three situations:

the cell of the home base station being in an open mode, or the cell of the home base station being in a hybrid access mode, or the cell of the home base station being in closed subscriber group mode and the cell of the home base station and a source cell from which a bearer is handed over belong to a same CSG.

In the present method, when the cell of the home base station is in closed subscriber group mode and the cell of the home base station and a primary cell of the master base station belong to a same CSG, the cell of the secondary base station may also be added to the secondary cell group. Two cells belonging to a same CSG means that CSG identities broadcasted by the two cells are the same and public land mobile network (PLMN) identities (IDs) broadcasted by the two cells contain a same PLMN ID.

When the cell of the home base station is in the hybrid access mode, the master base station sends the CSG member status of the UE in the cell of the home base station to the secondary base station.

The master base station knows the access mode of the cell of the secondary base station according to configuration or according to an X2 setup procedure or from the UE.

If the secondary base station accepts addition or modification of a secondary cell, the secondary base station sends a successful response to the master base station.

The secondary base station treats the UE according to the received CSG member status. The secondary base station may differentiate between a CSG member and a non-CSG member to decide whether to handover the UE or not, which guaranteed bit rate (GBR) bears are to accept, or which GBR bearers are to delete. The secondary base station may differentiate between a CSG member and a non-CSG member to decide data scheduling for a non-GBR bearer over an air interface.

At step 302, the master base station sends a CSG ID of a secondary cell, CSG member status, and a PLMN ID that serves the UE in the secondary cell to the MME.

The CSG member status needs to be contained, only when the secondary cell is in the hybrid access mode, and the secondary cell and the primary cell of the master base station or and a source cell from which a bearer is handed over belong to different CSGs. Two cells belonging to different CSGs means that CSG identities of the two cells are different or the two cells have not broadcasted a same PLMN ID, or one of the cells is a CSG or hybrid cell while the other cell is in the open mode.

The master base station may send the information to the MME when successful setup or modification of a bearer in the secondary cell is received at step 301.

If a cell of the secondary base station broadcasts multiple PLMN identities, the master base station selects a PLMN ID of a PLMN that serves the UE in the cell of the secondary base station.

In the circumstance that a secondary cell of the secondary base station is a CSG cell, or is in hybrid accessmode and is a CSG member cell, the UE sends a PLMN ID list to the master base station. The PLMN ID list is a list of, among PLMN IDs broadcasted by the secondary cell of the secondary base station, a PLMN ID that is a rPLMN ID or ePLMN ID of the UE, and the PLMN ID and a CSG ID broadcasted by the secondary cell are in a CSG list which can be accessed by the UE. According to the report of the UE, the master base station validates that the PLMN ID reported by the UE being a registered PLMN identity of the UE, rPLMN ID, or being an equivalent PLMN identity of the UE, ePLMN ID, and selects one that passes the validation to be the PLMN ID of the PLMN that serves the UE in the secondary cell of the secondary base station In the circumstance that the secondary cell of the secondary base station is in open mode or hybrid access mode and is not a CSG member cell, the master base station knows the PLMN ID list broadcasted by the secondary cell according to report of the UE (e.g., automatic neighbor relation (ANR)) or by X2 setup or by O&M configuration, and the master base station selects a PLMN identity that is a rPLMN ID or ePLMN ID of the UE from the PLMN identities broadcasted by the secondary cell to be the PLMN ID of the PLMN that serves the UE in the secondary cell of the secondary base station.

The master base station sends the PLMN identity of the PLMN that serves the UE in the cell of the secondary base station to the secondary base station.

The master base station may send the PLMN identity of the PLMN that serves the UE in the cell of the secondary base station to the MME via a path switch request message or via a ERAB Modification Indication message. If there are a plurality of secondary cells and PLMN identities that serve the UE in the respective secondary cells are different, the master base station may send a CSG identity and a PLMN identity that correspond to each secondary cell to the MME.

If the PLMN identity of a PLMN that serves the UE in the secondary cell of the secondary base station is the same with that of the primary cell of the master base station, then the master base station may only send the CSG identity of the secondary cell of the secondary base station to the MME. The MME knows that the PLMN that serves the UE in the secondary cell of the secondary base station is rPLMN according to no PLMN identity being present.

Or if the PLMN identity of the PLMN that serves the UE in the secondary cell of the secondary base station is the same with that of a source cell from which a bearer is handed over, then the master base station may only send the CSG identity of the secondary cell of the secondary base station to the MME. The MME knows that the PLMN ID that serves the UE in the secondary cell of the secondary base station is the same with a PLMN ID that serves the UE in the source cell from which the bearer is handed over according to no PLMN identity being present.

In the small cell architecture, the network may perform different charging and positioning for different ERABs. To support this kind of mechanism, the master base station also notifies the MME of a cell identity and TAI of a target cell to which the bearer is handed over. The TAI may contain the PLMN identity that serves the UE in the cell of the secondary base station. In this case, it may be unnecessary to send the above single PLMN identity repeatedly.

At step 303, the MME validates member status of the UE in the secondary cell. The MME validates the member status of the UE according to the PLMN identity and CSG identity of the secondary cell. The PLMN identity of the secondary cell is a PLMN identity of the secondary cell received from the master base station, and it may be a PLMN identity broadcasted by the secondary cell, or may be a PLMN identity that serves the UE in the secondary cell selected by the master base station from PLMN identities broadcasted by the secondary cell.

In the small cell architecture, the network may perform different charging and positioning for different ERABs. To support this kind of mechanism, if a PLMN identity or CSG identity or CSG member status of a target cell to which a bearer is handed over is not the same with that of a source cell, the MME sends the PLMN identity and/or CSG identity and/or CSG member status of the target cell to the SGW and PGW, so that the network may perform different charging and positioning for respective bearers. CSG identities being different includes a situation where a target cell and a source cell both have CSG identities and the CSG identities are different and a situation where one of a target cell and a source cell has a CSG identity while the other does not, i.e., in the open mode.

In the small cell architecture, the network may perform different charging and positioning for different ERABs. To support this kind of mechanism, the MME sends a cell identity and TAI of the target cell to the SGW and PGW, so that the network may perform different charging and positioning for each bearer.

At step 304, the MME sends a validated CSG member status of the UE in the secondary cell to the master base station. The MME may send the validated CSG member status of the UE in the secondary cell to the master base station in the circumstance that a target cell to which a bearer is handed over is a hybrid cell and the target cell and a source cell belong to different CSGs, or the source cell does not have a CSG identity.

The master base station sends the validated CSG member status of the UE to the secondary base station. The master base station may send the validated CSG member status of the UE in the secondary cell to the secondary base station all the time or send the validated CSG member status to the secondary base station when the validated CSG member status of the UE is different from that is sent in step 301.

With the above method, when the target cell is a cell of a home base station, proper access control or member verification may be performed for the UE so that the network can perform reasonable charging and positioning for the UE.

Figure 4:
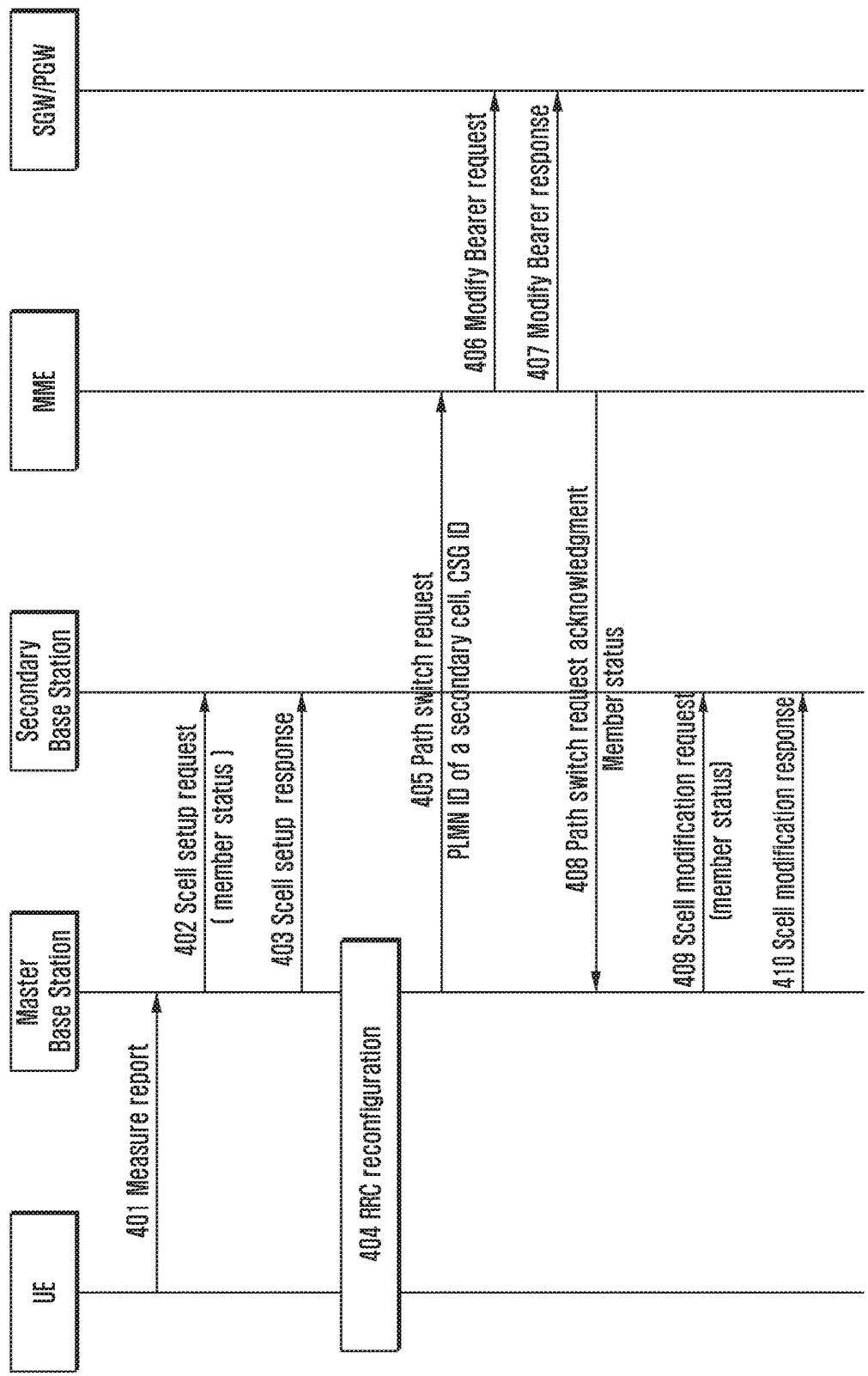
FIG. 4 is a schematic diagram of a method for controlling, charging, and positioning a UE in a small cell system according to embodiment 1 of the present invention.

FIG. 4 is a schematic diagram of a method for controlling, charging, and positioning a UE in a small cell system according to embodiment 1 of the present invention. The method includes the following steps.

At step 401, a master base station receives a measure report of the UE, the master base station decides to hand over a certain bearer to a cell of a secondary base station, which includes handing over the bearer from the master base station to the secondary base station or handing over the bearer from one secondary base station to a new secondary base station. For the situation of handing over the bearer from the source secondary base station to the new secondary base station, a process of handover between the master base station and the source secondary base station is omitted. Multiple bearers may be handed over, and methods of handing over multiple bearers are the same with that of handing over one bearer. Herein one bearer is used for illustration.

In the circumstance that the secondary base station is in the home base station open mode, or hybrid access mode, or in CSG mode and the cell of the secondary base station and a source cell from which the bearer is handed over are in a same CSG, the secondary cell may be added to a secondary cell group of the UE. In the method of the present invention, the secondary cell may be added to the secondary cell group of the UE when the cell of the secondary base station and the primary cell of the master base station belong to a same CSG.

How the master base station to obtain the access mode of the cell of the secondary base station, how to obtain the CSG identity of the cell of the secondary base station when the access mode is CSG or hybrid access mode, and how to obtain CSG member status of the UE in the hybrid secondary cell from the UE are the same with that in step 301, which will not be elaborated herein.

At step 402, the master base station sends a secondary cell setup request message to the secondary base station. The message may also be a secondary eNB addition request, used to set up a bearer in the cell of the secondary base station.

If a new cell of the secondary base station is a hybrid cell, the master base station sends CSG member status of the UE in the cell of the secondary base station to the secondary base station. The master base station obtains the CSG member status of the UE in the secondary cell from the UE.

If the cell of the secondary base station broadcasts multiple PLMN identities, the master base station selects a PLMN identity that serves the UE in the cell of the secondary base station. The detailed selection method is the same with that in step 302, and will not be elaborated herein. The master base station sends the selected PLMN identity to the secondary base station.

At step 403, the secondary base station sends a Scell setup response or SeNB addition acknowledgement message to the master base station.

At step 404, the master base station reconfigures the UE.

At step 405, the master base station sends a path switch request message to the MME. The message may also be other messages used for bearer handover. The message contains a CSG identity of a target cell to which a bearer is handed over, and a PLMM identity that is selected for the UE in the target Scell. The message may also contain a cell identity and/or tracking area identity (TAI) of the target cell to which the bearer is handed over.

If multiple bearers are handed over to multiple cells of the secondary base station respectively, and a PLMN identity that serves the UE in each cell may be different, the master base station may send the PLMN identity corresponding to each cell to the MME.

If multiple bearers are handed over to multiple cells of the secondary base stations, and a CSG identity of each cell may be different, the master base station may send the CSG identity corresponding to each cell to the MME.

If multiple bearers are handed over to multiple cells of the secondary base station respectively and a CSG of each cell may be different, the master base station may send a CSG identity and a PLMN identity corresponding to each cell to the MME.

If the PLMN identity of the PLMN that serves the UE in the secondary cell of the secondary base station is the same with that in the primary cell of the master base station, the master base station may only send a CSG identity of the secondary cell of the secondary base station to the MME. The MME knows that the PLMN identity that serves the UE in the secondary cell of the secondary base station is a rPLMNID of the primary cell of the master base station according to no PLMN identity being present.

Or if the PLMN identity of the PLMN that serves the UE in the secondary cell of the secondary base station is the same with that in the source cell from which the bearer is handed over, then the master base station may only send the CSG identity of the secondary cell of the secondary base station to the MME. The MME knows that the PLMN identity that serves the UE in the secondary cell of the secondary base station is the same with the PLMN identity of the source cell from which the bearer is handed over according to no PLMN identity being present.

In the small cell architecture, the network may perform different charging and positioning for different ERABs. To support this kind of mechanism, the master base station also notifies the MME of the cell identity and TAI of the target cell to which a bearer is handed over. The TAI may contain a PLMN identity that serves the UE in the cell of the secondary base station. In this circumstance, it may be unnecessary to send the above single PLMN identity repeatedly.

The MME validates the member status of the UE in the secondary cell. The MME verify the member status of the UE according to the PLMN identity and CSG identity of the secondary cell. The detailed method is the same with that in step 303 and will not be elaborated herein.

At step 406, the MME sends a modify bearer request message to the SGW/PGW.

In the small cell architecture, the network may perform different charging for different ERABs. To support this kind of mechanism, if the PLMN identity or CSG identity or CSG member status of the target cell to which the bearer is handed over is different from that in the source cell, the MME sends a PLMN identity and/or CSG identity and/or CSG member status of the target cell to which the bearer is handed over to the SGW and the PGW, so that the network may perform different charging for each bearer.

In the small cell architecture, the network may perform different charging and positioning for different ERABs. To support this kind of mechanism, the MME sends a cell identity and TAI of a target cell to the SGW and the PGW, so that different charging and positioning may be performed for each bearer in the network.

At step 407, the SGW/PGW sends a modify bearer response message to the MME.

At step 408, the MME sends a path switch request acknowledgment message to the master base station. The message may be other response message for bearer handover. The message contains CSG member status, and the CSG member status is the validated member status by the MME. The MME may send the validated member status of the UE in the secondary cell to the master base station when the target cell to which the bearer is handed over is a hybrid cell and the target cell and the source cell belong to different CSGs, or when the target cell to which the bearer is handed over is a hybrid cell and the source cell is in the open mode.

At step 409, the master base station sends a Scell modification request message to the secondary base station. The Scell modification request message contains CSG member status. The CSG member status is the validated CSG member status received from the MME. The master base station may send the validated CSG member status of the UE to the secondary base station all the time, or send the validated CSG member status to the secondary base station when the validated CSG member status of the UE is different from that sent in step 402.

At step 410, the secondary base station sends a Scell modification response message to the master base station. In the present method, this step is not essential.

Providing the processing method in FIG. 4, when a target cell is a home base station cell, proper access control and member validation may be performed for the UE, so that the network can perform reasonable charging and positioning for the UE.

Figure 5:
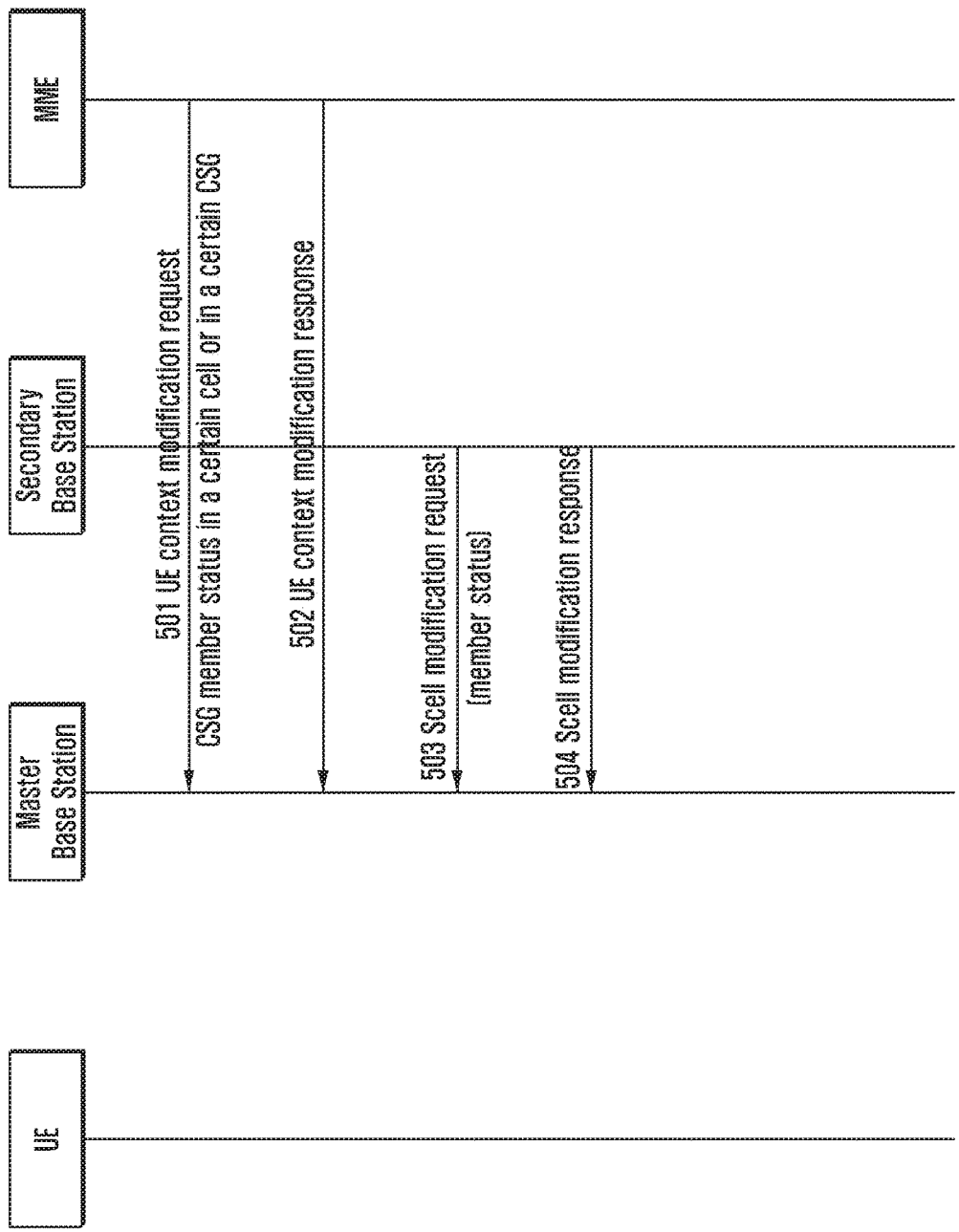
FIG. 5 is a schematic diagram of a method for controlling, charging, and positioning a UE in a small cell system according to embodiment 2 of the present invention.

FIG. 5 is a schematic diagram of a method for controlling, charging and positioning a UE in a small cell system according to embodiment 2 of the present invention. The method includes the following steps.

At step 501, the MME sends a UE context modification request message to the master base station to inform the master base station of the CSG member status of the UE in a certain cell or in a certain CSG. The MME discovers that the UE member status is changed between a member and a non-member under a certain CSG according to update of subscription information of the UE, and the MME needs to notify this to the base station. The MME notifies the base station of a corresponding cell identity and updated CSG member status, or the MME notifies the base station of the PLMN ID, CSG ID and updated CSG member status. The CSG includes the cell accessing mode being CSG access mode and hybrid access mode.

At step 502, the master base station sends a UE context modification response message to the MME.

At step 503, the master base station receives the update information of the CSG member status of the UE in the Scell. If the Scell is a CSG cell, and if the UE changes from a member to a non-member in the Scell, then the master base station deletes bearers in the Scell or hands over the bearers to other cells.

If the Scell is a hybrid mode cell, the master base station sends a Scell modification request to the secondary base station. The message contains CSG member status, and the member status indicates updated member status. The Scell modification request also contains a cell identity of the secondary cell.

The step 502 and step 503 do not have a decisive order.

At step 504, the secondary base station sends a Scell modification response message to the master base station. In the method of the present invention, the step is not an essential one.

By way of the processing method given in FIG. 5, the base station is updated in time to get updated CSG member status and the UE is controlled and scheduled reasonably.

Figure 6:
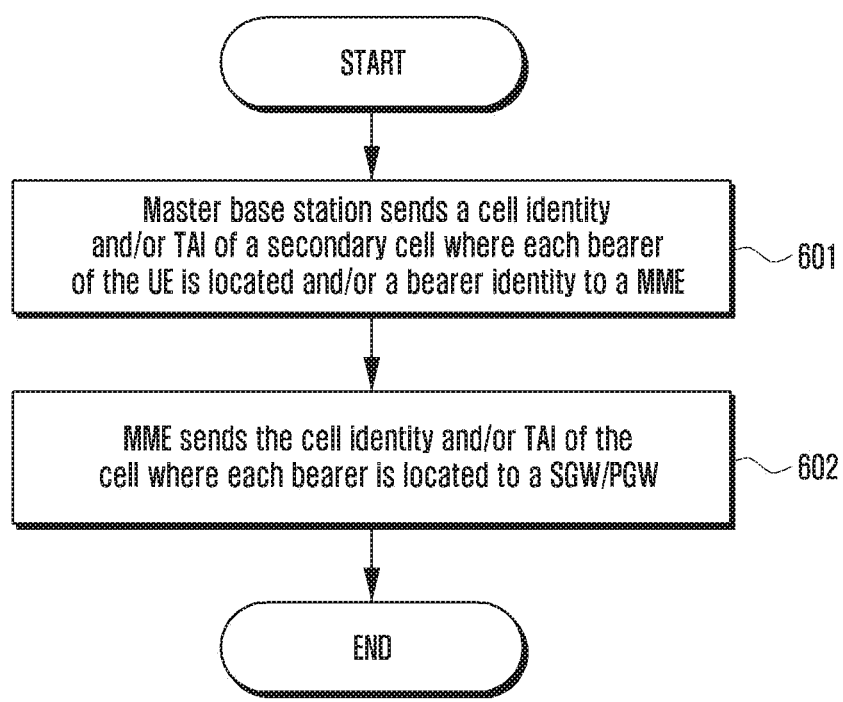
FIG. 6 is a schematic diagram of method 1 for charging and positioning a UE in a small cell system according to the present invention.

FIG. 6 is a schematic diagram of a method 1 for charging and positioning a UE in a small cell system according to the present invention. The method includes the following steps.

At step 601, a master base station sends a cell identity and/or TAI of a secondary cell where a bearer of the UE is located to a MME. The master base station sends a cell identity and/or TAI of a primary cell of the master base station to the MME via an existing message. The master base station sends a cell identity and/or TAI of a Scell where each bearer is located to the MME via a ERAB setup list. The ERAB setup list contains information on each ERAB to be setup, e.g., an ERAB identity, a cell identity and/or TAI of a cell where an ERAB is located.

At step 602, the MME sends the cell identity and/or TAI of the cell where each bearer is located and/or a bearer identity to a SGW/PGW.

When a cell identity and/or TAI of a cell where a certain ERAB is located changes, the master base station sends a changed cell identity and/or TAI of a cell where the certain ERAB is located and/or a bearer identity to the MME, and the MME sends the changed cell identity and/or TAI of the cell where the bearer is located and/or the bearer identity to the a SGW/PGW.

The cell identity in the present invention may be an E-UTRAN Cell Global Identifier (ECGI).

By way of the processing method given in FIG. 6, the network may perform ERAB-based charging and positioning to guarantee that the charging and positioning is performed more reasonably and precisely.

Figure 7:
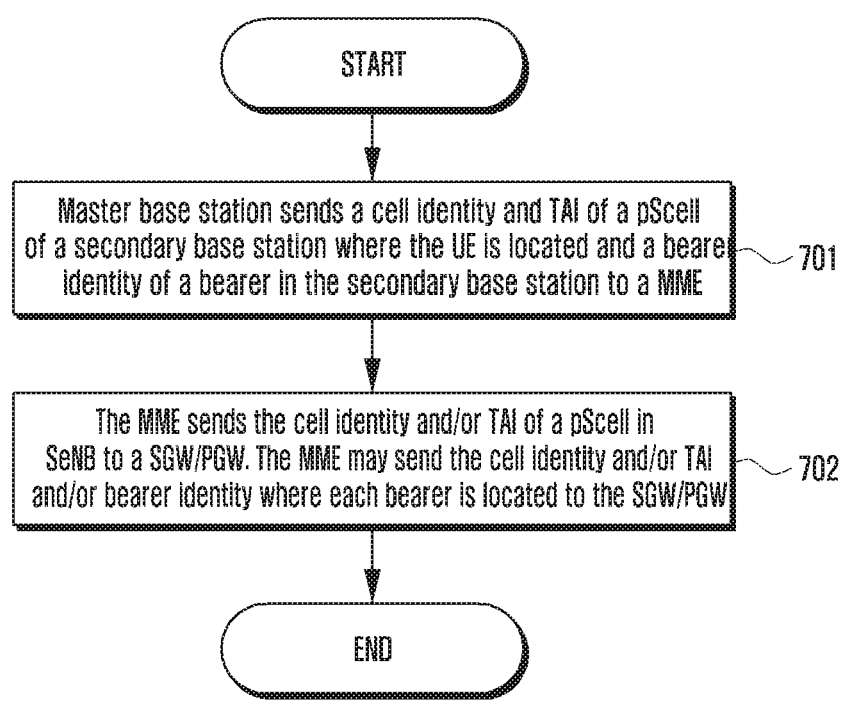
FIG. 7 is a schematic diagram of method 2 for charging and positioning a UE in a small cell system according to the present invention.

FIG. 7 is a schematic diagram of a second method for charging and positioning a UE in a small cell system according to the present invention. The method includes the following steps.

At step 701, a master base station sends a cell identity and TAI of a pScell in a secondary base station of the UE and a bear identity of a bearer in the secondary base station. If there are a plurality of bearers, then a plurality of bearer identities are sent to a MME, namely, letting the MME know which bearers are in the secondary base station, and the cell identity and TAI of the pScell of the secondary base station. The master base station may send a cell identity and/or TAI of a primary cell of the master base station to the MME via an existing message. The master base station may send a cell identity and/or TAI of a pScell in SeNB to the MME. The ERAB setup list contains information on each setup ERAB, e.g., an ERAB identity, and/or a cell identity and/or TAI of a cell where an ERAB is located.

In the situation that a SeNB selects a pScell, the SeNB sends a cell identity of a selected pScell to the master base station.

At step 702, the MME sends the cell identity and/or TAI of a pScell in SeNB to a SGW/PGW. The MME may send the cell identity and/or TAI and/or bearer identity where each bearer is located to the SGW/PGW.

When a certain ERAB is handed over between the master base station and the secondary base station, the master base station sends a cell identity and/or TAI of a target cell where the bearer belongs and/or a bearer identity to the MME, and the MME sends the cell identity and/or TAI of the target cell where the bearer belongs and/or the bearer identity to the SGW/PGW.

The cell identity in the present invention may be an ECGI.

By way of the processing method given in FIG. 7, the network may perform ERAB-based charging and positioning to guarantee that the charging and positioning is performed more reasonably and precisely.

The third method for charging and positioning a UE in a small cell system according to the present invention is performing charging and positioning according to a primary cell of a master base station. The method includes the following steps.

The master base station sends a cell identity and TAI of the primary cell of the master base station to a MME. The MME sends the cell identity and/or TAI of the primary cell of the master base station to a SGW/PGW.

It should be understood that the foregoing is only preferred embodiments of the invention and is not intended to limit the present invention. Any modification, equivalent substitution, and improvement without departing from the spirit and principle of this invention should be covered in the protection scope of the invention.

The invention claimed is:

1. A method for controlling a user equipment (UE), by a master base station, in a dual connectivity, the method comprising:
receiving, from the UE, a closed subscriber group (CSG) member status of the UE and a CSG identity (ID);
transmitting, to a secondary base station, a first message for adding the secondary base station, the first message including the CSG member status of the UE;
receiving, from the secondary base station, a second message in response to the first message;
transmitting, to the UE, a radio resource control (RRC) connection reconfiguration message for configuring a radio resource of the secondary base station;
transmitting, to a mobility management entity (MME), a third message for CSG member verification for the UE after transmission of the RRC connection reconfiguration message, the third message including the CSG member status of the UE, the CSG ID, and a public land mobile network (PLMN) ID; and
receiving, from the MME, a fourth message including a result of the CSG member verification,
wherein the PLMN ID included in the third message is determined based on a PLMN ID check.

2. The method of claim 1,
wherein the PLMN ID check includes a determination on whether a PLMN ID of the UE is a registered PLMN ID or an equivalent PLMN ID, and
wherein the secondary base station includes a hybrid access HeNB.

3. The method of claim 1,
wherein the third message is transmitted to request verification of the CSG member status of the UE for the CSG ID, and
wherein the first message includes the CSG member status of the UE and is used by the secondary base station to consider that the UE is subscribed to a CSG.

4. The method of claim 1, wherein the PLMN ID included in the third message is selected among a plurality of PLMN IDs based on the PLMN ID check, in case that the plurality of PLMN IDs passes the PLMN ID check.

5. A method by a mobility management entity (MME), in a dual connectivity, the method comprising:
receiving, from a master base station, a first message to verify a closed subscriber group (CSG) member status of a user equipment (UE) after a radio resource control (RRC) connection reconfiguration message for configuration of a radio resource of a secondary base station is transmitted from the master base station to the UE, the first message including the CSG member status of the UE, a CSI identity (ID), and a public land mobile network (PLMN) ID;
verifying the CSG member status of the UE based on the CSG member status of the UE, the CSI ID, and the PLMN ID; and
transmitting, to the master base station, a second message including a result of the verification of the CSG member status,
wherein the PLMN ID included in the first message is determined based on a PLMN ID check.

6. The method of claim 5,
wherein the PLMN ID check includes a determination on whether a PLMN ID of the UE is a registered PLMN ID or an equivalent PLMN ID, and
wherein the PLMN ID included in the first message is selected among a plurality of PLMN IDs based on the PLMN ID check, in case that the plurality of PLMN IDs passes the PLMN ID check.

7. The method of claim 6,
wherein the CSG member status of the UE and the CSG ID are transmitted from the UE to the master base station,
wherein the first message is transmitted to request verification of the CSG member status of the UE for the CSG ID, and
wherein the secondary base station includes a hybrid access HeNB.

8. A method for controlling a user equipment (UE), by a secondary base station in a dual connectivity, the method comprising:
receiving, from a master base station, a radio resource control (RRC) connection reconfiguration message for configuring a radio resource of the secondary base station, the RRC connection reconfiguration message including a closed subscriber group (CSG) member status of the UE;
transmitting, to the master base station, a response message for the RRC connection reconfiguration message; and
receiving, from the master base station, a message including a result of a CSG member status verification for the UE after transmission of the response message,
wherein the CSG member status verification is based on the CSG member status of the UE, a CSG identity (ID), and a public land mobile network (PLMN) ID transmitted from the master base station to a mobility management entity (MME), and
wherein the PLMN ID is determined based on a PLMN ID check.

9. The method of claim 8,
wherein the PLMN ID check includes a determination on whether a PLMN ID of the UE is a registered PLMN ID or an equivalent PLMN ID,
wherein the PLMN ID is selected among a plurality of PLMN IDs based on the PLMN ID check, in case that the plurality of PLMN IDs passes the PLMN ID check, and
wherein the secondary base station includes a hybrid access HeNB.

10. The method of claim 8, wherein the RRC connection reconfiguration message includes the CSG member status of the UE and is used by the secondary base station to consider that the UE is subscribed to a CSG.

11. A master base station for controlling a user equipment (UE), in a dual connectivity, the master base station comprising:
a transceiver; and
at least one processor coupled with the transceiver and configured to:
receive, from the UE, a closed subscriber group (CSG) member status of the UE and a CSG identity (ID),
transmit, to a secondary base station, a first message for adding the secondary base station, the first message including the CSG member status of the UE,
receive, from the secondary base station, a second message in response to the first message, transmit, to the UE, a radio resource control (RRC) connection reconfiguration message for configuring a radio resource of the secondary base station, transmit, to a mobility management entity (MME), a third message for CSG member verification for the UE after transmission of the RRC connection reconfiguration message, the third message including the CSG member status of the UE, the CSG ID, and a public land mobile network (PLMN) ID, and receive, from the MME, a fourth message including a result of the CSG member verification, wherein the PLMN ID included in the third message is determined based on a PLMN ID check.

12. The master base station of claim 11, wherein the PLMN ID check includes a determination on whether a PLMN ID of the UE is a registered PLMN ID or an equivalent PLMN ID, and wherein the secondary base station includes a hybrid access HeNB.

13. The master base station of claim 11, wherein the third message is transmitted to request verification of the CSG member status of the UE for the CSG ID, and wherein the first message includes the CSG member status of the UE and is used by the secondary base station to consider that the UE is subscribed to a CSG.

14. The master base station of claim 11, wherein the PLMN ID included in the third message is selected among a plurality of PLMN IDs based on the PLMN ID check, in case that the plurality of PLMN IDs passes the PLMN ID check.

15. A mobility management entity (MME), in a dual connectivity, the MME comprising:

a transceiver; and at least one processor coupled with the transceiver and configured to:

receive, from a master base station, a first message to verify a closed subscriber group (CSG) member status of a user equipment (UE) after a radio resource control (RRC) connection reconfiguration message for configuration of a radio resource of a secondary base station is transmitted from the master base station to the UE, the first message including the CSG member status of the UE, a CSI identity (ID), and a public land mobile network (PLMN) ID, verify the CSG member status of the UE based on the CSG member status of the UE, the CSI ID, and the PLMN ID, and transmit to the master base station, a second message including a result of the verification of the CSG member status, wherein the PLMN ID included in the first message is determined based on a PLMN ID check.

16. The MME of claim 15, wherein the PLMN ID check includes a determination on whether a PLMN ID of the UE is a registered PLMN ID or an equivalent PLMN ID, and wherein the PLMN ID included in the first message is selected among a plurality of PLMN IDs based on the PLMN ID check, in case that the plurality of PLMN IDs passes the PLMN ID check.

17. The MME of claim 16, wherein the CSG member status of the UE and the CSG ID are transmitted from the UE to the master base station, wherein the first message is transmitted to request verification of the CSG member status of the UE for the CSG ID, and wherein the secondary base station includes a hybrid access HeNB.

18. A secondary base station for controlling a user equipment (UE), in a dual connectivity, the secondary base station comprising:

a transceiver; and at least one processor coupled with the transceiver and configured to:

receive, from a master base station, a radio resource control (RRC) connection reconfiguration message for configuring a radio resource of the secondary base station, the RRC connection reconfiguration message including a closed subscriber group (CSG) member status of the UE, transmit, to the master base station, a response message for the RRC connection reconfiguration message, and receive, from the master base station, a message including a result of a CSG member status verification for the UE after transmission of the response message, wherein the CSG member status verification is based on the CSG member status of the UE, a CSG identity (ID), and a public land mobile network (PLMN) ID transmitted from the master base station to the MME, and wherein the PLMN ID is determined based on a PLMN ID check.

19. The secondary base station of claim 18, wherein the PLMN ID check includes a determination on whether a PLMN ID of the UE is a registered PLMN ID or an equivalent PLMN ID, wherein the PLMN ID is selected among a plurality of PLMN IDs based on the PLMN ID check, in case that the plurality of PLMN IDs passes the PLMN ID check, and wherein the secondary base station includes a hybrid access HeNB.

20. The secondary base station of claim 18, wherein the RRC connection reconfiguration message includes the CSG member status of the UE and is used by the secondary base station to consider that the UE is subscribed to a CSG.

* * * * *